United States Patent [19]
Lee

[11] Patent Number: 6,011,756
[45] Date of Patent: Jan. 4, 2000

[54] AUDIOFREQUENCY SIGNAL ADAPTER WITH A ROTARY WIRE LOCATING MEMBER

[76] Inventor: Jean Chin Chu Lee, Room 6, 11th Floor, No. 410, Sec. 5, Jongshiow East Road, Taipei, Taiwan

[21] Appl. No.: 09/324,107

[22] Filed: Jun. 2, 1999

[30] Foreign Application Priority Data

May 14, 1999 [TW] Taiwan ................................. 88207763

[51] Int. Cl.⁷ ..................................................... H04B 1/20
[52] U.S. Cl. ............................................... 369/2; 369/289
[58] Field of Search ................................ 369/2–3, 1, 4–5, 369/11–12, 289, 21; 360/137, 104, 109; 174/65 R

[56] References Cited

U.S. PATENT DOCUMENTS

| | | | |
|---|---|---|---|
| 3,946,156 | 3/1976 | Budrose | 369/1 |
| 4,287,388 | 9/1981 | Beer et al. | 381/78 |
| 4,734,897 | 3/1988 | Schotz . | |
| 5,161,131 | 11/1992 | Borchardt et al. | 369/1 |
| 5,307,326 | 4/1994 | Osawa | 369/2 |
| 5,444,675 | 8/1995 | Bie et al. | 369/2 |
| 5,586,090 | 12/1996 | Otte . | |
| 5,910,866 | 6/1999 | Shiomoto | 360/104 |

*Primary Examiner*—Ali Neyzari
*Attorney, Agent, or Firm*—Rosenberg, Klein & Lee

[57] ABSTRACT

An audiofrequency signal adapter with a rotary wire locating member, including: an audio cassette-shaped housing; an adapting circuit including a coupled magnetic head and a signal compensation circuit fixedly mounted in the cassette, the signal compensation circuit having an outwardly extending signal wire for connecting with an external audio signal source; and a wire locating member pivotally disposed on a rear side of the cassette. The wire locating member is formed with multiple notches. The signal wire of the signal compensation circuit extends through one of the notches out of the cassette. After rotating open the wire locating member, the signal wire can selectively ride in one of the notches. After the wire locating member is rotated back and latched with the cassette so as to firmly define the direction in which the signal wire extends out of the cassette.

4 Claims, 6 Drawing Sheets

1

AUDIOFREQUENCY SIGNAL ADAPTER WITH A ROTARY WIRE LOCATING MEMBER

BACKGROUND OF THE INVENTION

The present invention relates to an audiofrequency signal adapter with a rotary wire locating member. By means of the rotary wire locating member, a user is able to conveniently and quickly change the direction in which the signal wire is conducted out of the cassette and reliably locate the signal wire at a selected position.

A modern car is usually equipped with an in-car CD player. However, when running, the car will be inevitably shocked. This often disables the CD player from normally playing the CD. In contrast, an in-car cassette player is able to stably play a cassette despite of the shock. Therefore, it is desired to output the fine audiofrequency signal of a portable CD player via the high quality stereo system and speakers of the car so as to achieve a music with high quality.

U.S. Pat. No. 4,734,897 discloses an audiofrequency signal adapter. The adapter is formed as a cassette which has a profile identical to that of a common audio tape cassette and can be inserted into the cassette player deck of the car. A coupled circuit is disposed in the cassette, including a set of coupled magnetic heads. By means of the adapter, the audiofrequency signal of a portable CD player via the high quality stereo system and speakers of the car so as to achieve a music with high quality.

However, different types of car-used audio devices have different cassette players. Therefore, the cassette is loaded into the cassette player in different directions. The cassette of the adapter of the above patent is formed with U-shaped channels at rear ends of rear, left and right side walls. Wire openings are formed at different positions on the U-shaped channels. According to the type of the cassette player deck of the car, a user can hide and extend the signal wire along the U-shaped channel and conduct the signal wire out of the cassette from the wire opening of one of the side walls.

However, the signal wire can be hardly reliably located in any of the wire openings so that the signal wire is apt to unexpectedly detach from the selected wire opening.

In the case that the signal wire is detached from the U-shaped channel to drop out of the cassette, the cassette or the signal wire will be clogged in the cassette player deck of the car and cannot be taken out. Therefore, prior to each use of the adapter, the user must first check whether the signal wire is well received and ensure that the signal wire is firmly located in the selected wire opening. Such procedure is quite troublesome and the above problems still often take place due to negligence.

In order to solve the problems existing in U.S. Pat. No. 4,734,897, U.S. Pat. No. 5,586,090 provides an adapter enabling the playback of various audio devices such as compact disc players and the like through a cassette player of either front or side loading type. The adapter is provided with a user removable partial cover which permits repositioning of its external electrical conductor which is connected to the audio device. In this measure, the electrical conductor can be positioned so as not to interfere with the internal mechanisms within the cassette player during use.

However, it is necessary to unscrew two screws with a screwdriver so as to change the U-shaped opening through which the electrical conductor is extended out of the cassette. Such procedure is still inconvenient for the user.

SUMMARY OF THE INVENTION

It is therefore a primary object of the present invention to provide an audiofrequency signal adapter with a rotary wire locating member by which without any tool, the position where the signal wire extends out of the cassette can be conveniently changed.

It is a further object of the present invention to provide the above audiofrequency signal adapter which is able to reliably fix the signal wire at a selected position on the cassette without unexpected detachment. Therefore, the problem is eliminated that the entire cassette or the signal wire is clogged in the cassette player deck of the car and cannot be taken out.

It is still a further object of the present invention to provide the above audiofrequency signal adapter which is able to precisely and reliably fix the signal wire at a selected position on the cassette. Therefore, for the same user who frequently uses the same in-car cassette player deck, prior to each use, it is unnecessary to check whether the signal wire is well received or ensure that the signal wire is precisely fixed at the selected wire opening. This facilitates use of the adapter.

According to the above objects, the audiofrequency signal adapter with a rotary wire locating member of the present invention includes: a cassette having an appearance and a dimension identical to those of a common audio tape cassette, at least a pair of spindles being rotatably mounted in the cassette, the spindles being drivingly rotatable in the same direction, whereby when the cassette is placed into a cassette player deck, the spindles are synchronously rotated thereby so as to keep the cassette player normally operating, a rear side of the cassette being formed with a receptacle; an adapting circuit including a coupled magnetic head and a signal compensation circuit, the coupled magnetic head being resiliently slidably disposed in a front side of the cassette, whereby when the cassette is inserted into the cassette player deck, the coupled magnetic head is resiliently correspondingly coupled with a magnetic head in the deck, the signal compensation circuit being fixedly mounted in the cassette and connected with the coupled magnetic head, the signal compensation circuit having an outward extending signal wire for connecting with an external audio signal source; and a wire locating member, a first end of the wire locating member being pivotally disposed in a first end of the receptacle of the rear side of the cassette, whereby the wire locating member can be rotated outward or inward and totally received in the receptacle, the wire locating member being formed with multiple one notches, the signal wire of the signal compensation circuit being conducted out of the cassette through one of the notches, whereby the signal wire can selectively ride in one of the notches of the wire locating member and after the wire locating member is rotated inward and latched in the cassette, the direction in which the signal wire is conducted out of the cassette is firmly fixed.

In the above audiofrequency signal adapter, the wire locating member is a substantially U-shaped member. A first end of the wire locating member is formed with a pivot section having a through hole in which a pivot shaft of the cassette is snugly fitted, whereby the wire locating member can be outward rotated about the pivot shaft. Each side section of the wire locating member is formed with at least one notch in which the signal wire rides. The wire locating member is further formed with at least one locating projection, whereby when the wire locating member is moved and hidden in the receptacle of rear side of the cassette, the locating projection is snugly latched in a corresponding locating dent formed in the receptacle.

In the above audiofrequency signal adapter, a second end of the wire locating member is formed with a stopper shoulder and a latch arm projecting from inner side of the stopper shoulder. When the wire locating member is received in the receptacle, the stopper shoulder abuts against a bottom edge of a lateral wall of the cassette and the latch arm is resiliently leant against and latched with an inner side of the lateral wall so as to firmly locate the wire locating member in the receptacle.

In the above audiofrequency signal adaptel, an outer side of the second end of the wire locating member is formed with a finger cavity, whereby a user can extend his/her finger into the finger cavity for rotating the wire locating member.

The present invention can be best understood through the following description and accompanying drawings wherein:

DETAILED DESCRIPTION OF THE PREFERRED EMBODIMENT

Figure 1:
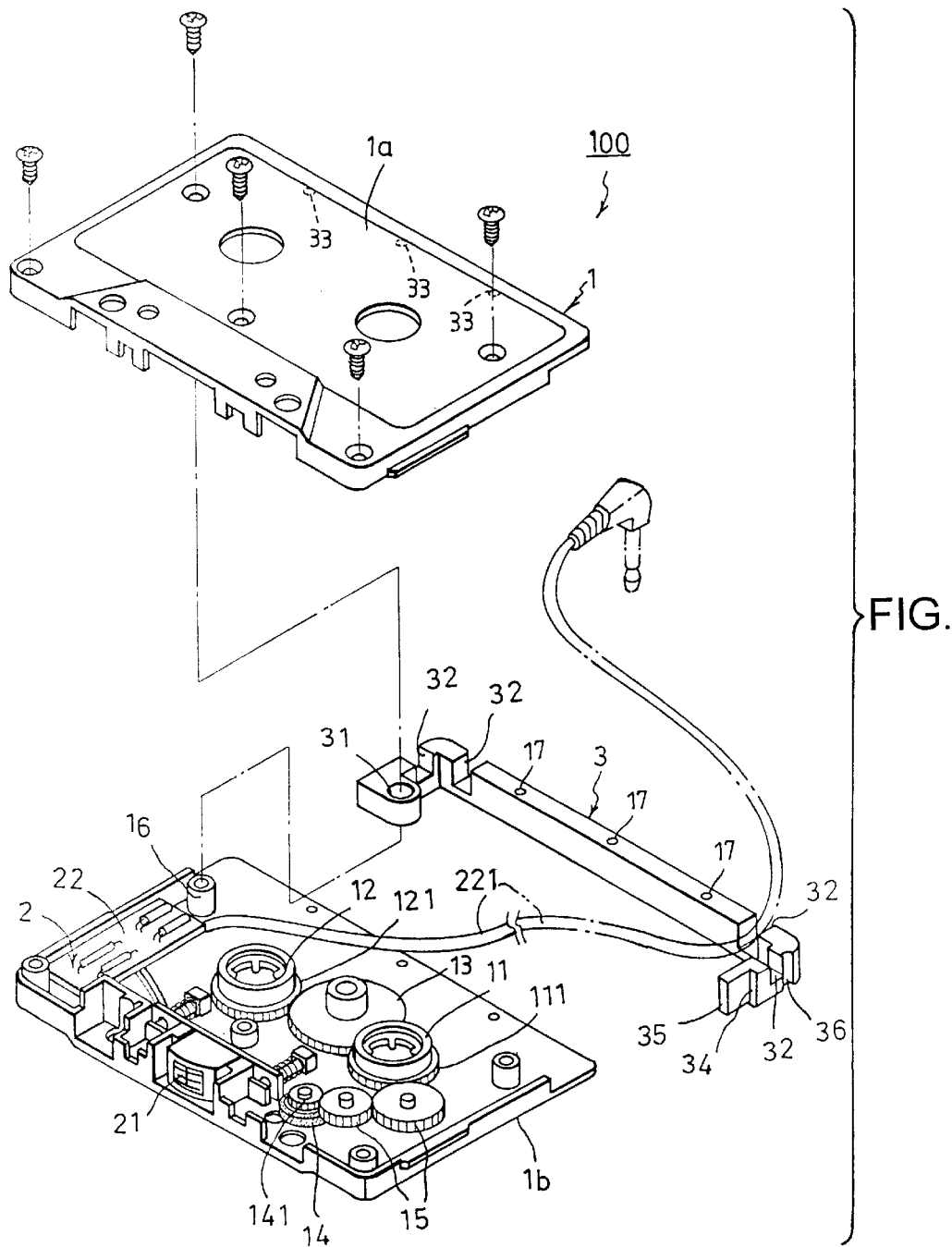
FIG. 1 is a perspective exploded view of the present invention.
Figure 2:
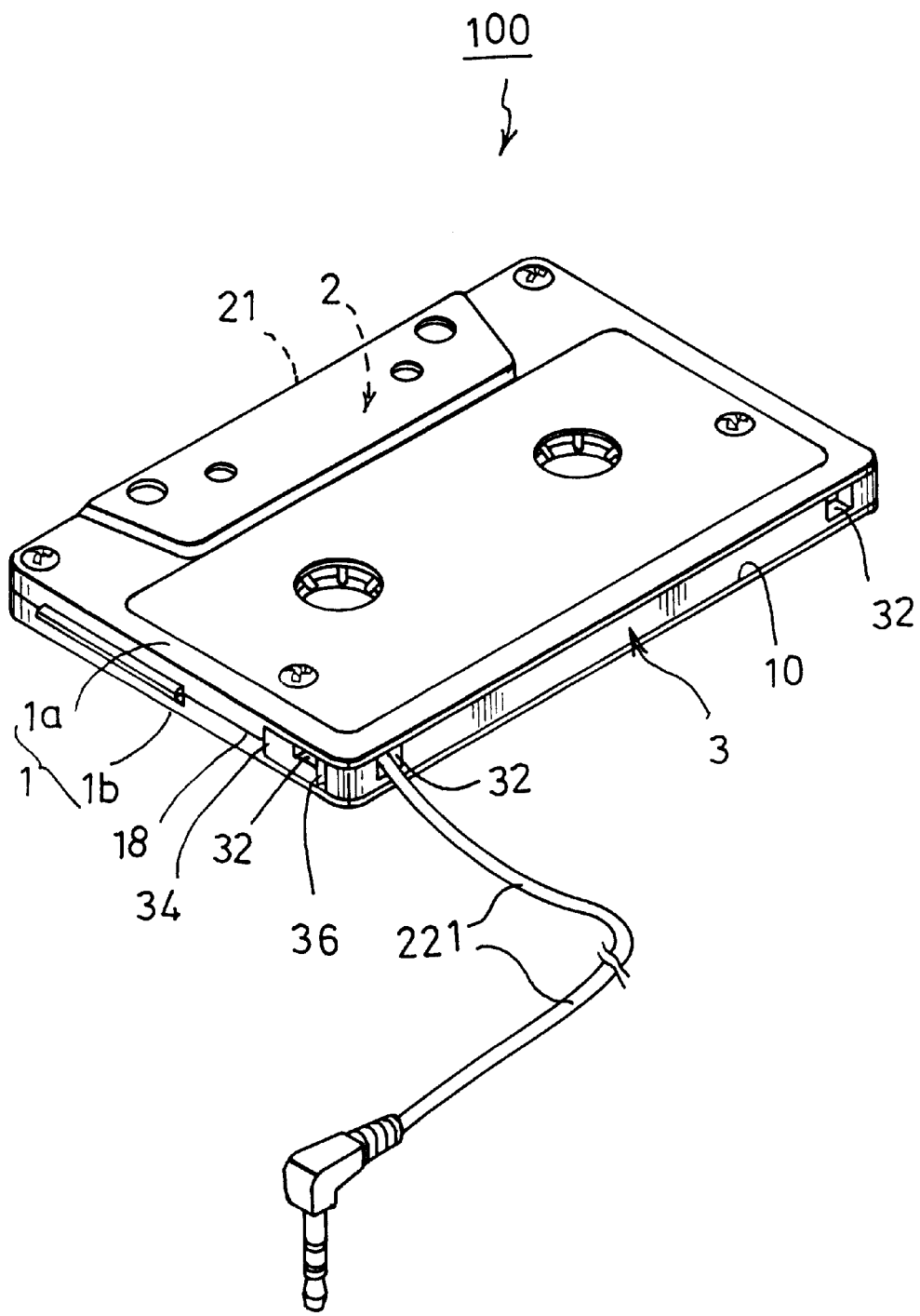
FIG. 2 is a perspective assembled view of the present invention.

Please refer to FIGS. 1 to 6. The audiofrequency signal adapter 100 of the present invention includes: a cassette 1 having a profile and a dimension identical to those of a common audio tape cassette; an adapting circuit 2 including a coupled magnetic head 21 and a signal compensation circuit 22 fixedly mounted in the cassette 1, the signal compensation circuit 22 having an outward extending signal wire 21 for connecting with an external audio signal source; and a wire locating member 3 pivotally disposed on a rear side of the cassette 1. The wire locating member 3 is formed with multiple notches 32. The signal wire 221 of the signal compensation circuit 22 extends through one of the notches 32 out of the cassette 1. After rotating open the wire locating member 3, the signal wire 221 can selectively ride in one of the notches 32. Then, the wire locating member 3 is rotated back and latched with the cassette 1 so as to firmly define the direction in which the signal wire 221 extends out of the cassette 1.

The cassette 1 is formed by two casings 1a, 1b mated with each other and has an appearance and a dimension identical to those of a common audio tape cassette. Therefore, the cassette 1 can be snugly inserted into a cassette player deck 5 of an in-car stereo system. At least a pair of spindles 11, 12 are rotatably mounted in the cassette 1. A gear 111, 121 is fitted around each spindle 11, 12. A driving gear 13 is engaged between the two gears 111, 121. When the cassette 1 is placed into the cassette player deck 5, the spindles 11, 12 are synchronously rotated thereby so as to keep the cassette player normally operating. In addition, a driven wheel 14 is rotatably mounted in the cassette 1. A gear 141 is coaxially connected with the driven wheel. A gear set 15 is engaged between the gear 111 of one of the spindles 11 and the gear 141. When the cassette 1 is inserted into the cassette player deck 5, the driven wheel 14 is rotated thereby to drivingly rotate the spindles 11, 12 so as to keep the cassette player normally operating.

The adapting circuit 2 of the present invention includes: a coupled magnetic head 21 resiliently slidably disposed in front side of the cassette 1, when the cassette 1 is inserted into the cassette player deck 5, the coupled magnetic head 21 being resiliently correspondingly coupled with the magnetic head in the deck 5; and a signal compensation circuit 22 fixedly mounted in the cassette 1 and connected with the coupled magnetic head 21. The signal compensation circuit 22 has an outward extending signal wire 221 for connecting with an external audio signal source (such as a CD player 4a of FIG. 5 or a cellular phone 4b of FIG. 6). The audio signal of the audio signal source 4a or 4b is sent through the signal compensation circuit 22 and coupled magnetic head 21 to the magnetic head of the cassette player deck 5 and then emitted outside by the speakers of a car.

The above cassette 1 and the adapting circuit 2 are widely seen in the conventional adapters.

The wire locating member 3 of the present invention is a substantially U-shaped member which is snugly hidden a receptacle 10 on rear side of the cassette 1. A first end of the wire locating member 3 is formed with a pivot section having a through hole 31 in which a pivot shaft 16 of the cassette 1 is snugly fitted, whereby the wire locating member 3 can be outward rotated about the pivot shaft 16. Each side section of the wire locating member 3 is formed with at least one notch 32 in which the signal wire 221 rides. The top or bottom edge of the wire locating member 3 can be disposed with at least one locating projection 33, whereby when the wire locating member 3 is moved and hidden in the receptacle 10 of rear side of the cassette 1, the locating projection 33 can be snugly latched in a corresponding locating dent 17 formed in the receptacle 10 so as to firmly engage the wire locating member 3 in the receptacle 10.

Figure 3:
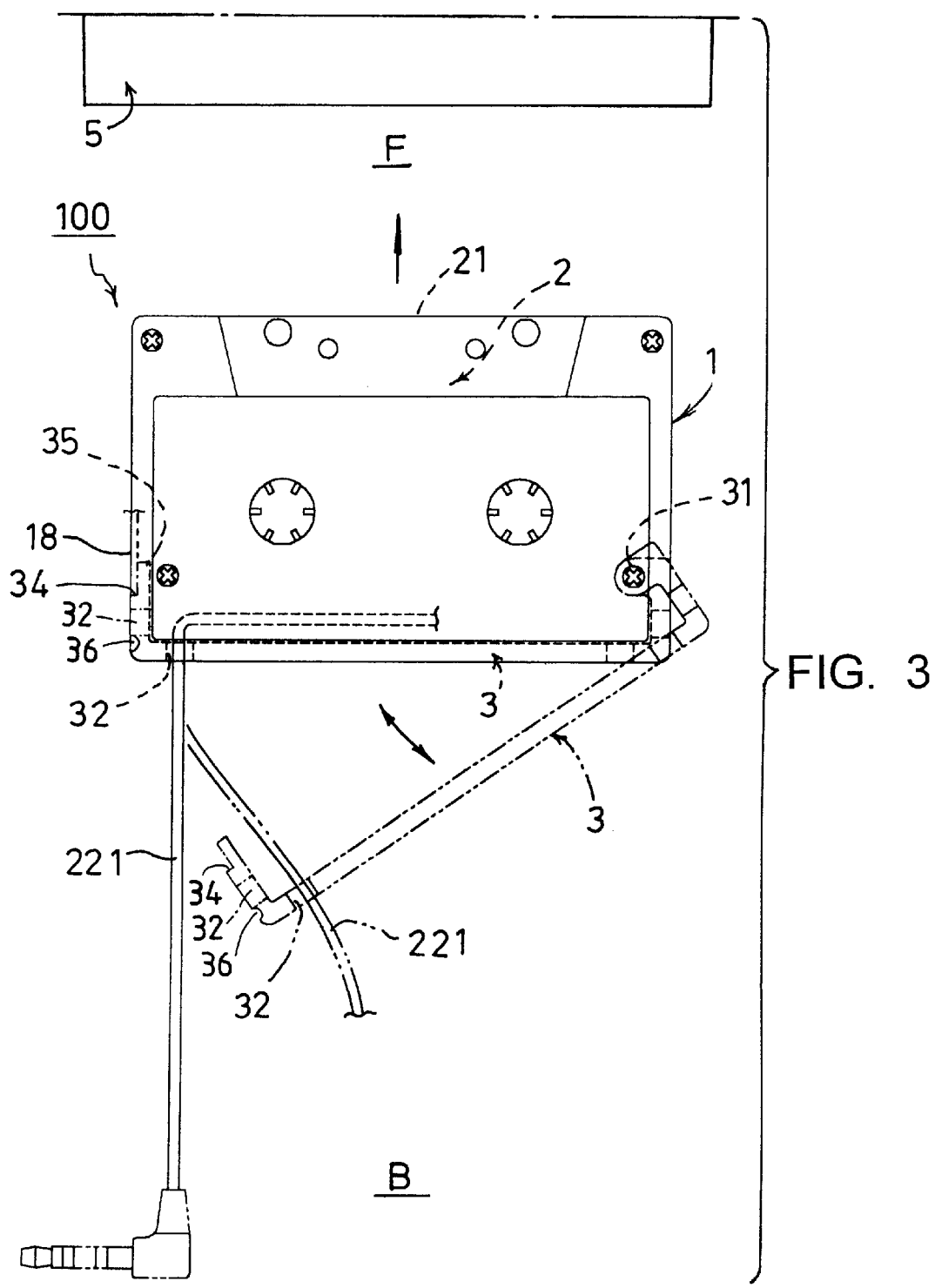
FIG. 3 is a top view of the present invention.

Referring to FIG. 3, a second end of the wire locating member 3 is formed with a stopper shoulder 34 and a latch arm 35 projecting from inner side of the stopper shoulder 34. When the wire locating member 3 is received in the receptacle 10, the stopper shoulder 34 abuts against a bottom edge of a lateral wall 18 of the cassette 1. At this time, the latch arm 35 is resiliently leant against and latched with an inner side of the lateral wall 18 so as to firmly locate the wire locating member 3 in the receptacle 10. An outer side of the second end of the wire locating member 3 is formed with a finger cavity 36, whereby a user can extend his/her finger into the finger cavity 36 for rotating the wire locating member 3.

Referring to FIG. 3, in the case that the cassette is loaded into the cassette player deck 5 with the front side F of the cassette inserted thereinto, the signal wire 221 must be conducted out from the rear side B of the cassette 1. Under such circumstance, the user can first outward rotate open the wire locating member 3 and then make the signal wire 221 ride in any of the notches 32 of the wire locating member 3 positioned on the rear side B of the cassette 1 (as shown by phantom line). Then the wire locating member 3 is again rotated and latched in the receptacle 10 of the cassette 1. At this time, the signal wire 221 is firmly conducted out from the rear side B of the cassette.

Figure 4:
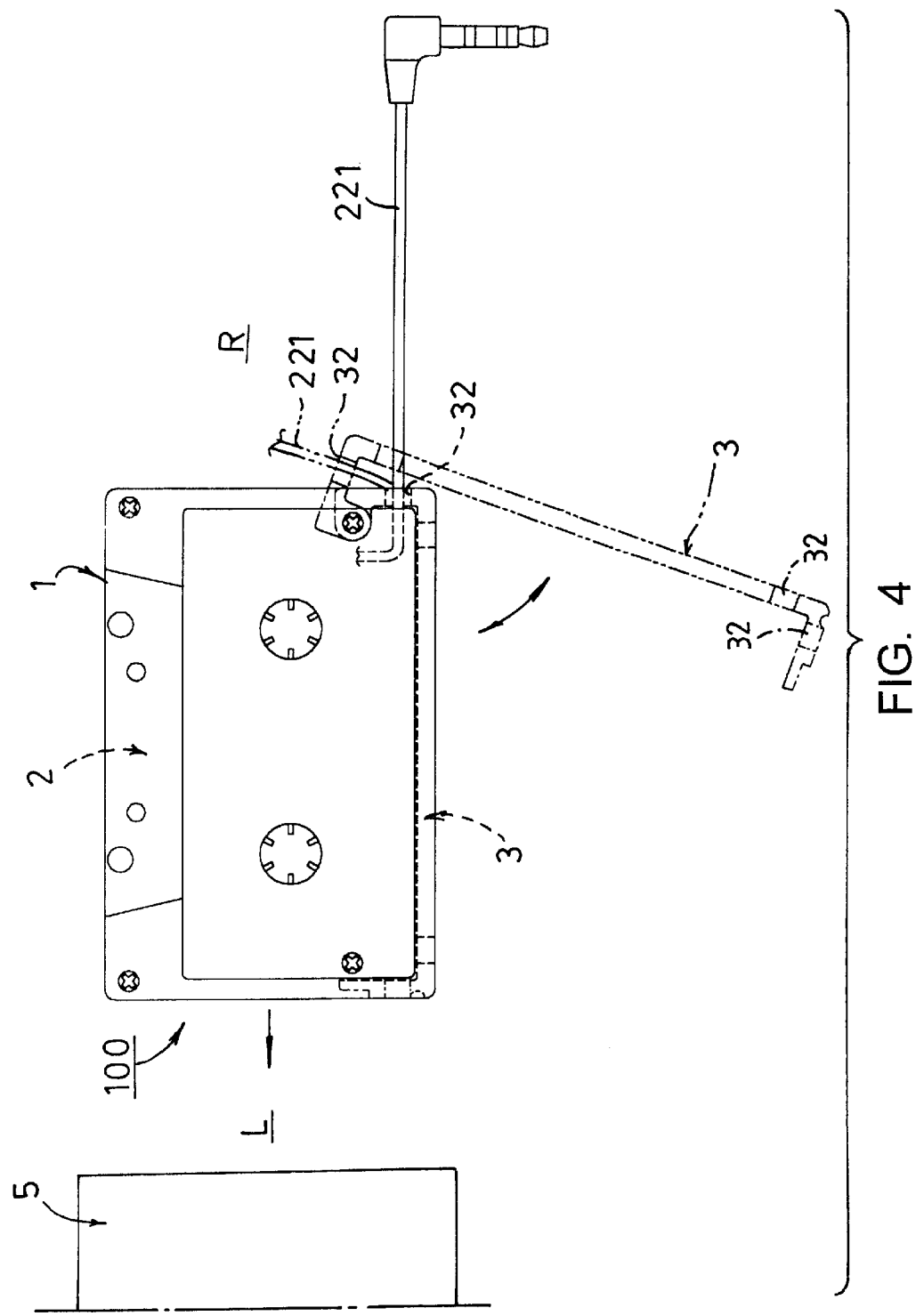
FIG. 4 is a top view according to FIG. 3, showing that the position of the signal wire is changed from a rear side to a right side of the cassette.

Referring to FIG. 4, in the case that the cassette is loaded into the cassette player deck 5 with the left side L of the cassette inserted thereinto, the signal wire 221 must be conducted out from the right side R of the cassette 1. Under such circumstance, the user can first outward rotate open the wire locating member 3 and then make the signal wire 221 ride in any of the notches 32 of the wire locating member 3 positioned on the right side R of the cassette 1 (as shown by phantom line). Then the wire locating member 3 is again rotated and latched in the receptacle 10 of the cassette 1. At this time, the signal wire 221 is firmly conducted out from the right side R of the cassette.

Figure 5:
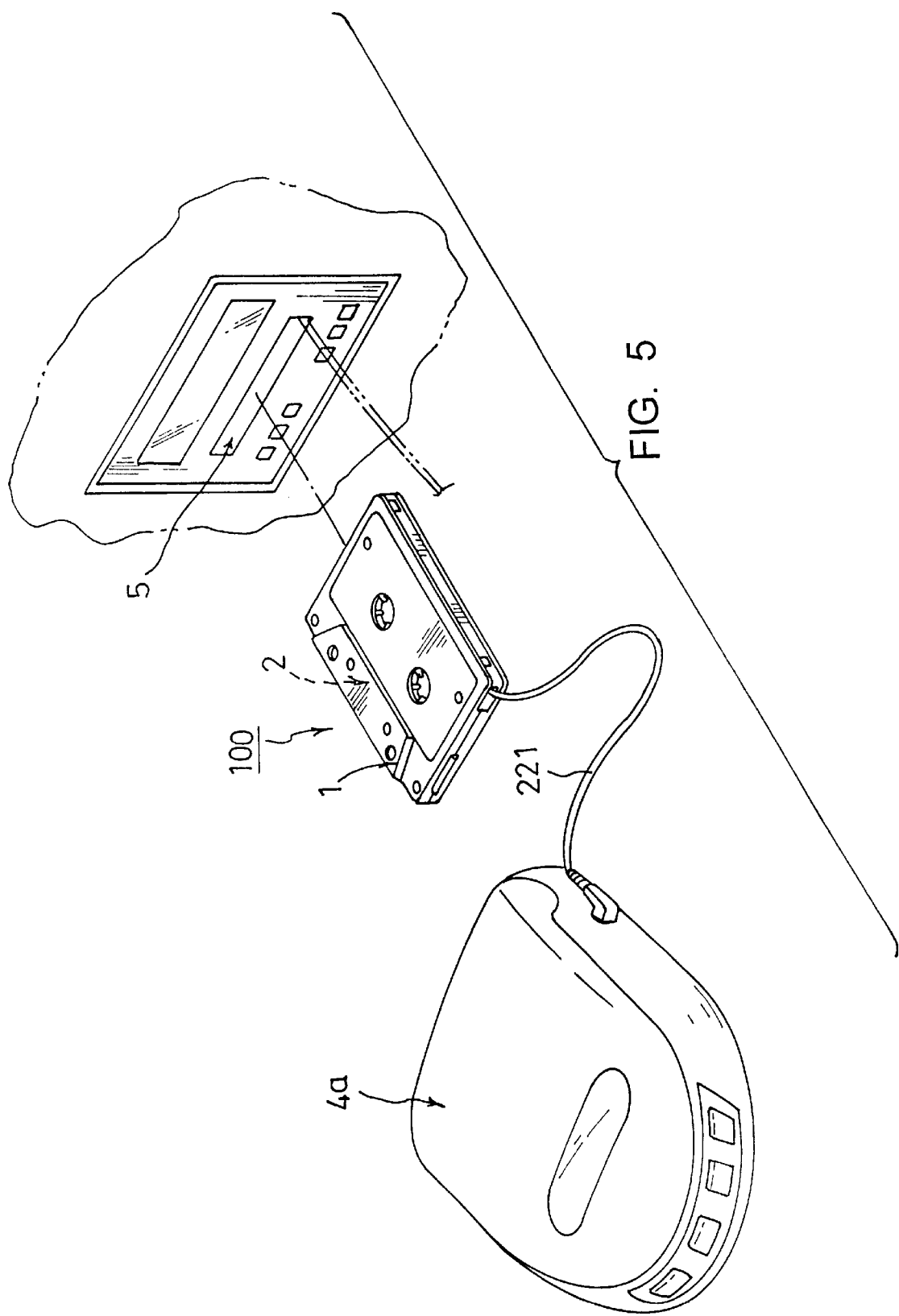
FIG. 5 shows that the present invention is inserted into an in-car cassette player deck to transmit the audio signal of a portable CD player to the in-car cassette player.
Figure 6:
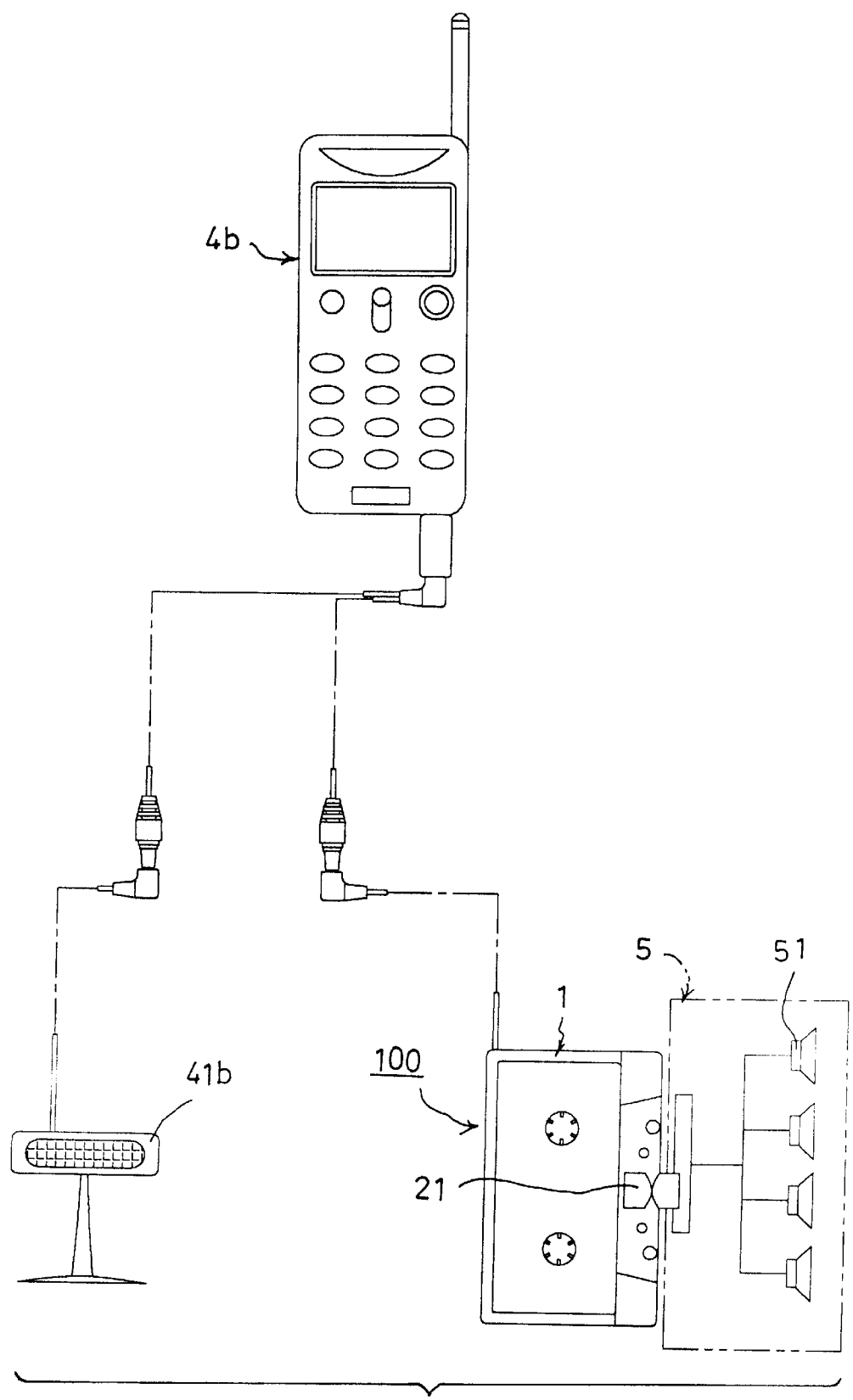
FIG. 6 shows that the present invention is inserted into an in-car cassette player deck to transmit the audio signal of a cellular phone to the in-car cassette player.

As shown in FIG. 5, the signal wire 221 conducted out of the cassette 1 is directly plugged into an audio output socket of a portable CD player 4a and then the cassette 1 is inserted into the cassette player deck 5 of the car. At this time, a high quality CD music can be heard from the in-car speakers. Alternatively, as shown in FIG. 6, the signal wire 221 is plugged into an audio output socket of a cellular phone 4b and then the cassette 1 is inserted into the cassette player deck 5 of the car. In addition, a microphone 41b is connected to the cellular phone 4b. At this time, the voice of a caller can be heard from the in-car speakers 51 to form a hold-free in-car communication system.

The audiofrequency signal adapter 100 of the present invention by means of the rotary wire locating member 3 is able to conveniently and quickly change the direction in which the signal wire 221 is conducted out of the cassette 1 and locate the signal wire 221.

Accordingly, the present invention has the following advantages:

1. The rotary wire locating member of the audiofrequency signal adapter can be easily rotated open so as to conveniently and quickly change the direction in which the signal wire is conducted out of the cassette.
2. In the audiofrequency signal adapter of the present invention, the second opening of the cassette is closed so that the signal wire can be precisely fixed at a selected position on the cassette without unexpected detachment. Therefore, the problem is eliminated that the entire cassette or the signal wire is clogged in the cassette player deck and cannot be taken out. In contrast, the signal wire 42 of the conventional audiofrequency signal adapter 10 can be hardly firmly received in the U-shaped channel 46. Therefore, it often takes place that the signal wire 42 unexpectedly drops out of the cassette 12. This will lead to that the cassette 12 or the signal wire 42 is clogged in the cassette player deck of the in-car stereo system or even that the entire cassette cannot be taken out.
3. By means of the wire locating member, the signal wire can be precisely fixed at a selected position on the cassette. Therefore, for the same user who frequently uses the same in-car cassette player deck, prior to each use, it is unnecessary to check whether the signal wire is well received or ensure that the signal wire is precisely fixed at the selected wire opening. This facilitates use of the adapter. In contrast, the signal wire 42 of the conventional audiofrequency adapter 10 is apt to unexpectedly detach from the selected wire opening. Therefore, prior to each use, the user needs to check whether the signal wire 42 is well received and ensure that the signal wire 42 is fixed at the selected wire opening. This is quite troublesome for the user and the above problems often take place due to incaution.

The above embodiment is only used to illustrate the present invention, not intended to limit the scope thereof. Many modifications of the above embodiment can be made without departing from the spirit of the present invention.

What is claimed is:

1. An audiofrequency signal adapter comprising:
   (a) an audio cassette shaped housing with a at least a pair of spindles being rotatably mounted in the cassette housing, the spindles being drivingly rotatable, whereby when the cassette housing is placed into a cassette player deck, the spindles are synchronously rotated for maintaining the normal operation of the cassette player, a rear side of the cassette housing being formed with a receptacle;
   (b) an adapting circuit including a coupled magnetic head and a signal compensation circuit, the coupled magnetic head being resiliently slidably disposed in a front side of the cassette housing, whereby when the cassette housing is inserted into the cassette player deck, the coupled magnetic head is resiliently correspondingly coupled with a magnetic head in the deck, the signal compensation circuit being fixedly mounted in the cassette housing and connected with the coupled magnetic head, the signal compensation circuit having an outwardly extending signal wire for connecting with an external audio signal source; and
   (c) a wire locating member, a first end of the wire locating member being pivotally disposed in a first end of the receptacle of the rear side of the cassette housing, whereby the wire locating member can be rotated outwardly or inwardly and totally received in the receptacle, the wire locating member being formed with multiple notches, the signal wire of the signal compensation circuit being conducted out of the cassette through one of the notches, whereby the signal wire can selectively ride in one of the notches of the wire locating member and after the wire locating member is rotated inward and latched in the cassette housing, a direction in which the signal wire is conducted out of the cassette housing is firmly fixed.

2. An audiofrequency signal adapter as claimed in claim 1, wherein the wire locating member is a substantially U-shaped member, a first end of the wire locating member being formed with a pivot section having a through hole in which a pivot shaft of the cassette housing is snugly fit, whereby the wire locating member can be outwardly rotated about the pivot shaft, each side section or the wire located member being formed with at least one notch in which the signal wire rides, the wire locating member being further formed with at least one locating projection, whereby when the wire locating member is moved and hidden in the receptacle of the rear side of the cassette housing, the locating projection being snugly latched in a corresponding locating dent formed in the receptacle.

3. An audiofrequency signal adapter as claimed in claim 1, wherein a second end of the wire locating member is formed with a stopper shoulder and a latch arm projecting from an inner side of the stopper shoulder, whereby when the wire locating member is received in the receptacle, the stopper shoulder abuts against a bottom edge of a lateral wall of the cassette housing and the latch arm is resiliently leaned against and latched with an inner side of the lateral wall so as to firmly locate the wire locating member in the receptacle.

4. An audiofrequency signal adapter as claimed in claim 1, wherein an outer side of a second end of the wire locating member is formed with a finger cavity, whereby a user's finger is positionable into the finger cavity for rotating the wire locating member.

* * * * *